(12) United States Patent
Lad et al.

(10) Patent No.: US 9,378,099 B2
(45) Date of Patent: Jun. 28, 2016

(54) INSTANT DATA CENTER RECOVERY

(71) Applicant: Catalogic Software, Inc., Woodcliff Lake, NJ (US)

(72) Inventors: Kamlesh Lad, Woodcliff Lake, NJ (US); Peter Chi-Hsiung Liu, Paramus, NJ (US)

(73) Assignee: CATALOGIC SOFTWARE, INC., Woodcliff Lake, NJ (US)

( * ) Notice: Subject to any disclaimer, the term of this patent is extended or adjusted under 35 U.S.C. 154(b) by 0 days.

(21) Appl. No.: 14/322,011

(22) Filed: Jul. 2, 2014

(65) Prior Publication Data
US 2014/0317059 A1  Oct. 23, 2014

Related U.S. Application Data

(63) Continuation-in-part of application No. 13/689,224, filed on Nov. 29, 2012, now abandoned, which is a continuation of application No. 11/993,643, filed as application No. PCT/US2006/024479 on Jun. 23, 2006, now Pat. No. 8,346,726.

(Continued)

(51) Int. Cl.
*G06F 17/30* (2006.01)
*G06F 11/14* (2006.01)

(52) U.S. Cl.
CPC ........ *G06F 11/1458* (2013.01); *G06F 11/1451* (2013.01); *G06F 11/1456* (2013.01); *G06F 11/1469* (2013.01); *G06F 2201/84* (2013.01)

(58) Field of Classification Search
CPC .............. G06F 3/0482; G06F 11/1469; G06F 11/2074; G06F 11/1458; G06F 11/1456; G06F 12/16; G06F 11/1451; G06F 11/1453; G06F 2201/84; G06F 9/5077; G06F 9/45558; G06F 9/50; G06F 9/45533; G06F 9/455
USPC .......... 707/781, 782, 784, E17.005, E17.032, 707/640, 649, 644, 645, 646; 711/162, 1, 711/114, 111, 112, 203, 6, 147, E12.001, 711/E12.103; 709/206, 203, 207, 208, 223, 709/213, 226, 219, 218; 714/6, 9, 5, 11, 21, 714/7, 13, 15, 20, 114; 370/389, 392, 396, 370/218, 244, 250, 426, 427; 718/1, 100, 718/102, 104
See application file for complete search history.

(56) References Cited

U.S. PATENT DOCUMENTS 4,588,479 A  5/1986  Weber et al.
5,018,078 A  5/1991  Urabe et al.
(Continued)

FOREIGN PATENT DOCUMENTS

WO  WO9309494  5/1993

OTHER PUBLICATIONS

G. G. Xie; Jibin Zhan; D. A. Maltz; and Hui Zhang—"On static reachability analysis of IP networks"—Published in: INFOCOM 2005. 24th Annual Joint Conference of the IEEE Computer and Communications Societies. Proceedings IEEE (vol. 3 ) ; Date of Conference: Mar. 13-17, 2005—pp. 2170-2183 vol. 3.*

(Continued)

*Primary Examiner* — Anh Ly
(74) *Attorney, Agent, or Firm* — Erik Huestis; Foley Hoag LLP

(57) ABSTRACT

Facility for providing backup and restore of all data center components including physical machines, virtual machines, routers, networks, sub-networks, switches, firewall, directory lookup, DNS, DHCP and internet access. Virtual or physical machines are associated to data center components and a software defined network, storage, and compute infrastructure is provided.

8 Claims, 1 Drawing Sheet

Related U.S. Application Data

(60) Provisional application No. 61/842,554, filed on Jul. 3, 2013, provisional application No. 60/693,715, filed on Jun. 24, 2005.

(56) References Cited

U.S. PATENT DOCUMENTS

| | | | |
|---|---|---|---|
| 5,018,097 A | 5/1991 | Kuhlmann et al. | |
| 5,047,923 A | 9/1991 | Elstner et al. | |
| 5,086,497 A | 2/1992 | Horikawa et al. | |
| 5,155,837 A | 10/1992 | Liu et al. | |
| 5,163,122 A | 11/1992 | Urabe et al. | |
| 5,231,636 A | 7/1993 | Rasmussen | |
| 5,276,860 A * | 1/1994 | Fortier | G06F 11/1451 714/6.3 |
| 5,325,520 A | 6/1994 | Nguyen et al. | |
| 5,410,621 A | 4/1995 | Hyatt | |
| 5,488,716 A | 1/1996 | Schneider et al. | |
| 5,633,999 A * | 5/1997 | Clowes | G06F 11/142 714/40 |
| 5,926,463 A * | 7/1999 | Ahearn et al. | 370/254 |
| 6,016,553 A | 1/2000 | Schneider et al. | |
| 6,101,327 A | 8/2000 | Holte-Rost et al. | |
| 6,289,356 B1 | 9/2001 | Hitz et al. | |
| 6,615,365 B1 | 9/2003 | Jenevein et al. | |
| 6,795,966 B1 | 9/2004 | Lim et al. | |
| 6,931,558 B1 | 8/2005 | Jeffe et al. | |
| 7,093,086 B1 | 8/2006 | van Rietschote | |
| 7,096,330 B1 * | 8/2006 | Root et al. | 711/162 |
| 7,191,299 B1 | 3/2007 | Kekre et al. | |
| 7,254,682 B1 | 8/2007 | Arbon | |
| 7,266,655 B1 | 9/2007 | Escabi, II et al. | |
| 7,313,614 B2 | 12/2007 | Considine et al. | |
| 7,322,010 B1 | 1/2008 | Mikula | |
| 7,356,679 B1 | 4/2008 | Le et al. | |
| 7,529,897 B1 | 5/2009 | Waldspurger et al. | |
| 7,539,706 B1 * | 5/2009 | Campbell | G06F 17/302 711/162 |
| 7,565,517 B1 | 7/2009 | Arbon | |
| 7,620,666 B1 * | 11/2009 | Root et al. | 711/162 |
| 7,721,138 B1 * | 5/2010 | Lyadvinsky | G06F 11/417 714/10 |
| 7,937,547 B2 | 5/2011 | Liu et al. | |
| 8,195,443 B2 | 6/2012 | Malloy et al. | |
| 8,255,651 B2 | 8/2012 | Liu et al. | |
| 2002/0016827 A1 * | 2/2002 | McCabe et al. | 709/213 |
| 2002/0049883 A1 | 4/2002 | Schneider et al. | |
| 2002/0069369 A1 * | 6/2002 | Tremain | 713/201 |
| 2002/0120763 A1 * | 8/2002 | Miloushev | G06F 17/30197 709/230 |
| 2003/0079102 A1 * | 4/2003 | Lubbers et al. | 711/202 |
| 2003/0126202 A1 | 7/2003 | Watt | |
| 2003/0135507 A1 * | 7/2003 | Hind et al. | 707/100 |
| 2003/0135609 A1 * | 7/2003 | Carlson et al. | 709/224 |
| 2003/0191911 A1 * | 10/2003 | Kleinschnitz, Jr. | G06F 8/63 711/154 |
| 2003/0217119 A1 * | 11/2003 | Raman et al. | 709/219 |
| 2004/0024867 A1 * | 2/2004 | Kjellberg | 709/224 |
| 2004/0039729 A1 * | 2/2004 | Boger et al. | 707/2 |
| 2004/0044744 A1 * | 3/2004 | Grosner et al. | 709/217 |
| 2004/0052397 A1 | 3/2004 | Aronson et al. | |
| 2004/0078467 A1 * | 4/2004 | Grosner et al. | 709/226 |
| 2004/0148376 A1 * | 7/2004 | Rangan et al. | 709/223 |
| 2004/0172574 A1 | 9/2004 | Wing et al. | |
| 2005/0027748 A1 * | 2/2005 | Kisley | 707/200 |
| 2005/0052397 A1 | 3/2005 | Chida | |
| 2005/0055603 A1 | 3/2005 | Soran et al. | |
| 2005/0193128 A1 * | 9/2005 | Dawson et al. | 709/229 |
| 2005/0198032 A1 * | 9/2005 | Cochran | 707/10 |
| 2005/0216454 A1 * | 9/2005 | Diab et al. | 707/3 |
| 2005/0216788 A1 * | 9/2005 | Mani-Meitav et al. | 714/6 |
| 2005/0262087 A1 * | 11/2005 | Wu et al. | 707/9 |
| 2006/0018505 A1 * | 1/2006 | Cherian | G06F 11/1469 382/100 |
| 2006/0036934 A1 * | 2/2006 | Fujiwara | 707/104.1 |
| 2006/0053261 A1 * | 3/2006 | Prahlad et al. | 711/162 |
| 2006/0059253 A1 * | 3/2006 | Goodman | G06Q 10/10 709/223 |
| 2006/0085792 A1 | 4/2006 | Traut | |
| 2009/0222496 A1 | 9/2009 | Liu et al. | |
| 2011/0251992 A1 | 10/2011 | Bethlehem et al. | |
| 2014/0317059 A1 | 10/2014 | Lad et al. | |

OTHER PUBLICATIONS

Daniel J. Worden—"SAN Backup and Recovery"—Title: SAN Backup and RecoveryBook—Title—Storage Networks—pp. 129-142—Copyright 2004.*

Newman, Wiberg & Braswell, Server Consolidation with VMware ESX Server, pp. 123-126, Jan. 11, 2005, http://www.redbooks.ibm.com/redpapers/pdfs/redp3939.pdf.

Marron, P.J. ; Inst. fur Inf., Freiburg Univ., Germany—"Design of a middleware service for scalable wide area network applications"—Published in: Distributed Objects and Applications, 2000. Proceedings. DOA '00. International Symposium on Date of Conference: 2000 pp. 263-272 Meeting Date :Sep. 21, 2000-Sep. 23, 2000.

Venkalesan, S. ; Dept of Comput. Sci., Pittsburgh Univ., PA, USA—"Message-optimal incremental snapshots" Published in: Distributed Computing Systems, 1989., 9th International Confeence on—Date of Conference: Jun. 5-9, 1989 pp. 53-60 Meeting Date :Jun. 5, 1989-Jun. 9, 1989.

* cited by examiner

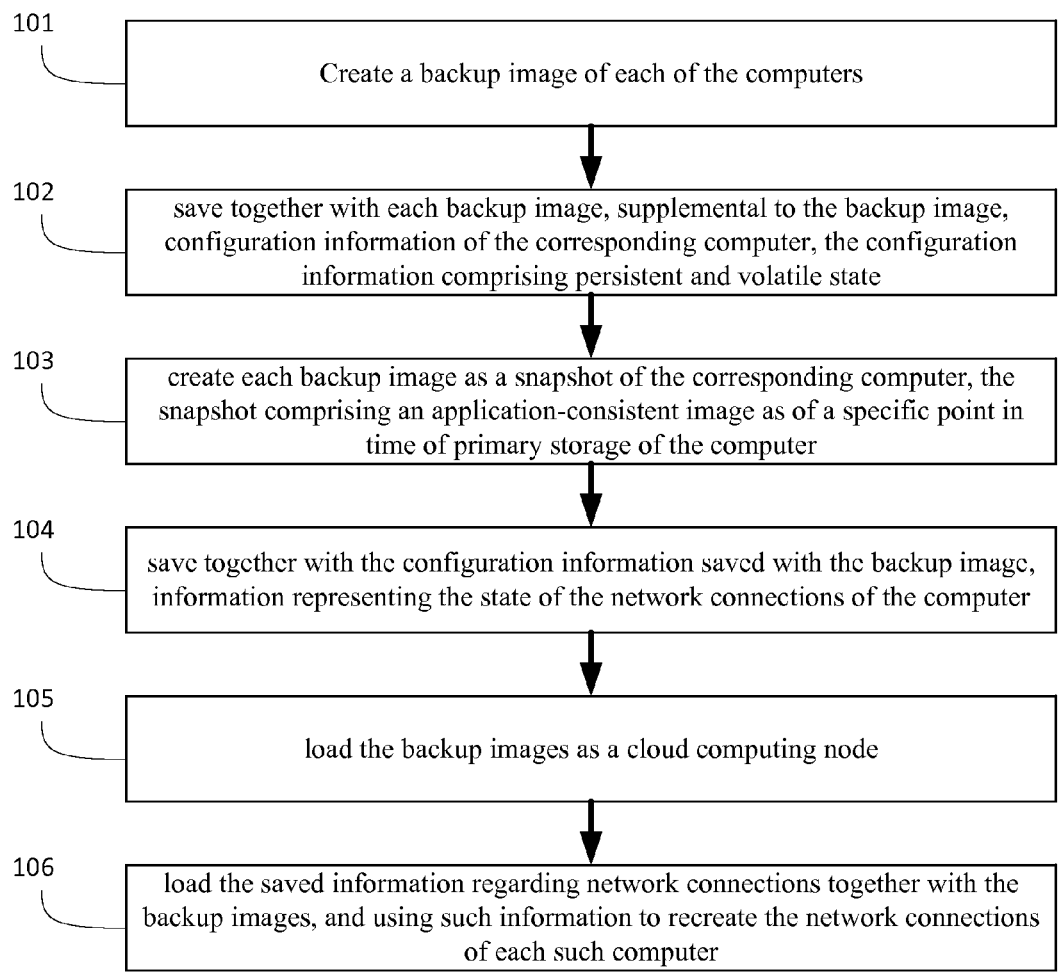

INSTANT DATA CENTER RECOVERY

CROSS-REFERENCE TO RELATED APPLICATIONS

This application claims the benefit of U.S. Provisional Application No. 61/842,554, filed Jul. 3, 2013 and is a continuation-in-part of application Ser. No. 13/689,224, filed Nov. 29, 2012, which is a continuation of application Ser. No. 11/993,643, now U.S. Pat. No. 8,346,726, which is the National Stage of International Application No. PCT/US2006/024479, filed Jun. 23, 2006, which claims the benefit of Provisional Application No. 60/693,715, filed Jun. 24, 2005, each of which are hereby incorporated by reference. This application also hereby incorporates by reference the respective disclosures of commonly assigned U.S. Pat. Nos. 8,346,726, 7,937,547 and 8,255,651.

BACKGROUND

The present disclosure is in the field of information technology, and more particularly relates to enterprise backup and disaster recovery.

BRIEF SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method of virtualizing a plurality of computers in a data center. The computers are connected to a network having a network topology. A backup image of each of the computers is created. Configuration information of the corresponding computer is saved together with each backup image, supplemental to the image. The configuration information includes persistent and volatile state. Each backup image is created as a snapshot of the corresponding computer. The snapshot comprises an application-consistent image as of a specific point in time of primary storage of the computer. Information representing the state of the network connections of the computer is saved together with the configuration information saved with the backup image. The backup image is loaded as a cloud computing node. The saved information regarding network connections is loaded together with the backup images. Using the saved information, the network connections of each computer are recreated.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 1 depicts a method according to an embodiment of the present disclosure.

DETAILED DESCRIPTION

The following is a description of several preferred embodiments of various aspects of the disclosed subject matter, showing details of how systems may be constructed to carry out various aspects of the disclosure, and the steps that can be employed to utilize such systems and to practice such methods. These embodiments are illustrative only, and the disclosed subject matter is by no means limited to particular examples shown. The specific features of any particular embodiment should not be understood as limiting the scope of what is claimed.

In addition, it should be understood that the accompanying figures are presented for illustrative purposes only. The disclosed methodology and system are each sufficiently flexible and configurable such that they may be utilized in ways other than those depicted.

In various embodiments, program instructions are provided. Such program instructions may be recorded on non-transitory machine-readable media. Non-transitory machine-readable media include computer-readable media exclusive of transitory signals per se, such as radio waves or other freely propagating electromagnetic waves, electromagnetic waves propagating through a waveguide or other transmission media, or electrical signals transmitted through a wire. Examples of non-transitory machine-readable media include, without limitation, hard disks drives, solid-state drives, other optical and magnetic storage media known in the art, random access memory (RAM), read-only memory (ROM), erasable programmable read-only memory (EPROM), compact disc (CD), DVD, floppy disks, and punch cards.

Various operations described herein may be carried out by one or more computer processors. Suitable processors include general those present in general purpose computers, special purpose computers, and ASICs. Operations executable by such processors include transmission and receipt of data via a network. In various embodiments, transmission and reception may be performed via a network interface. Suitable data networks include LANs, WANs, and the Internet. In other embodiments, logic may be provided in the form of discrete logic or programmable logic arrays, which perform the specified operations through a combination of hardware elements.

The methods and systems presented herein may be used for backup and instant recovery of an entire data center to a virtual computing environment. The disclosed subject matter is particularly suited for providing backup and restoration of all data center components including without limitation physical machines, virtual machines, routers, networks, subnetworks, switches, firewall, directory lookup, DNS, DHCP and internet access. For purpose of explanation and illustration, and not limitation, an exemplary embodiment of a method in accordance with the disclosed subject matter is shown in FIG. 1 and is designated generally by reference character 100. Similar reference numerals (differentiated by the leading numeral) may be provided among the various views and Figures presented herein to denote functionally corresponding, but not necessarily identical structures.

According to embodiments of the present disclosure, virtual or physical machines are associated with components to be backed up. Recovery of data center components may then be accomplished by recreating the functional equivalent of the data center. The data center recreation may be in a plurality of virtual machines in a cloud. In some embodiments, the cloud nodes are configured to define network, storage, and compute infrastructure that mirrors the source data center.

Referring to FIG. 1, an exemplary method is depicted according to an embodiment of the present disclosure. At 101, a backup image of each of the computers is created. At 102, configuration information of the corresponding computer is saved together with each backup image, supplemental to the image. The configuration information includes persistent and volatile state. At 103, each backup image is created as a snapshot of the corresponding computer. The snapshot comprises an application-consistent image as of a specific point in time of primary storage of the computer. At 104, information representing the state of the network connections of the computer is saved together with the configuration information saved with the backup image. At 105, the backup image is loaded as a cloud computing node. At 106, the saved information regarding network connections is loaded together with the backup images. Using the saved information, the network connections of each computer are recreated.

In some embodiments, a metadata collection agent collects information regarding the components in a data center. In some embodiments, the metadata collection agent is resident on each device of the data center. In other embodiments, the metadata collection agent is resident on a node operatively connected to the data center via a computer network, and operable to collect metadata regarding each device of the data center.

In some embodiments, those components of a data center having computer readable storage are automatically backed up to computer readable backup media. Computer readable backup media may include hard disk drives (HDD), solid-state drives (SSD), tape, compact disk (CD), digital video (or versatile) disk (DVD), Flash, diskette, EPROM, or other optical or magnetic storage media known in the art. In some embodiments, all information gathered during the backup process is sent to a selected destination. In some embodiments, the information is sent to a destination by transport of a computer readable backup medium. In other embodiments, the information is replicated via a computer network to a disaster recover (DR) site or to a public cloud.

Information regarding each physical and virtual machine in the data center is collected. Such information may vary based on the type of device in question, and may include: network configuration; disk volumes; application state; and operating system state. Network configuration information may include MAC addresses, IP addresses, open ports, and network topology. Disk volume information may include capacity, logical layout, partition maps, metadata regarding contents, as well as physical characteristics.

In some embodiments, the collection of information includes determining what components are required for each virtual or physical machine in the data center to operate. Examples of required components include: Network routers; Network firewalls; Internet Access; Directory Lookup (e.g., AD, LDAP), Single Sign-On, DHCP, DNS; iSCSI storage devices; FC storage devices; and NAS file servers (e.g., NFS or CIFS). Determining the required components may include collecting application specific information for each machine in the data center, and determining application dependencies of each application. Determining required components may also include analyzing network topology information to determine connected or accessible devices.

The collected information and the backup data are used to recreate the source physical or virtual data center in a substitute data center. In some embodiments, the substitute data center is software-defined to emulate the source data center. In some embodiments, the substitute data center comprises a plurality of physical machines that are dynamically reconfigured to conform to the source data center configuration. In other embodiments, the substitute data center comprises a plurality of virtual machines that are dynamically configured to conform to the source data center configuration. In yet other embodiments, the substitute data center comprises a plurality of cloud resources. The substitute data center emulates, or provides the functional equivalent of, the source data center. In some embodiments, the substitute data center provides a complete substitute for the source data center. In other embodiments, the substitute data center provides only a selected subset of functionality of the source data center. For example, where a source data center has computation, network and storage aspects, a subset of this functionality may be selected to be performed by the substitute data center. In some embodiments, multiple substitute data centers may each substitute for aspects of the source data center.

In a substitute data center in the cloud, the cloud may be public or private. To properly configure cloud resources to provide a substitute data center, embodiments of the present disclosure create vendor-specific configuration or image files. Such vendor-specific files are used by a cloud provider to instantiate cloud resources suitable for the creation of a substitute data center. For example, in an Amazon Web Services (AWS) cloud deployment, a CloudFormation template may be generated that enumerates the AWS resources to be instantiated in the substitute data center.

Embodiments of the present disclosure are applicable in a variety of circumstances where automatic recreation of a datacenter is desirable. Such circumstances include: Disaster recovery for the data center; Update testing; Application development testing; Disaster recovery testing for data center; and Migration to cloud services.

In some embodiments, recreation of a source data center includes recreating one or more of the source: networks, firewalls, Internet access, directory and like services, and storage facilities. Thus, the substitute data center will be configured to include functional substitutes for the features of the source network.

As noted above, information is collected regarding the network configuration of the source data center, either during a backup process or during an independent network interrogation process. Network information may include router and switch configuration information as well as network topology information. In some embodiments, individual routers and switches are backed up as part of the backup process. In some embodiments, routers and switches are not individually backed up, but their surrounding network topology is determined. Using this information, a software-defined network may be created that resembles the original physical or virtual networks. In some embodiments, creation of the software defined network in the substitute data center comprises configuring a plurality of virtual machines. In some embodiments, creation of the software defined network comprises generating and providing configuration parameters to a cloud service provider. For example, in an Amazon Web Services (AWS) cloud deployment, a CloudFormation template may be generated that describes the network layout of the substitute data center. In some embodiments, the configuration parameters may include descriptions of Virtual Private Clouds (VPCs), Subnets, Gateways, Route Tables and Network Access Control Lists (ACLs). In some embodiments, a programmatic interface is provided that may be used to configure the network parameters of the software-defined network of the substitute data center in order to recreate the source data center network environment.

Information regarding any firewalls in the source data center may be collected during the backup process. In some embodiments, information regarding firewalls is collected by directly backing up a firewall device in the source data center. In some embodiments, firewall configuration is gathered by probing the network. Using the information gathered regarding any firewalls, a firewall configuration may be recreated using software-defined network infrastructure, using a programmatic interface. Rules for network traffic for each individual firewall may be re-created in the software-defined network.

Information regarding public internet access may be collected during the backup process. In some embodiments, such information is collected by backing up the configuration of individual devices, such as routers and firewalls, in the source data center. In other embodiments, such information is collected by probing the network, routers or firewalls of the source data center. Using the information gathered, public internet access may be recreated in the software-defined network.

Information regarding Directory and Like Services may be collected during the backup process. In some embodiments, such information is collected by backing up systems that provide directory lookup such as Lightweight Directory Access Protocol (LDAP), Active Directory (AD), single sign-on, Dynamic Host Configuration Protocol (DHCP) servers, Domain Name System (DNS) servers, and the like. In other embodiments, information is collected from one or more of such servers and aggregated. In some embodiments, the services are recreated in a compatible Platform as a Service (PaaS) in a public or private cloud. In some embodiments, the PaaS environment is instantiated by invocation of a programmatic interface of the cloud service provider.

Storage facilities from the source data center may be recreated using software-defined storage in a public or private cloud. Storage facilities may include an iSCSI, FC, or NAS storage. Storage in the cloud may include, for example, Amazon Simple Storage Service (S3), AWS Storage Gateway, or Amazon Elastic Block Store (EBS).

While the disclosed subject matter is described herein in terms of certain exemplary embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

While various embodiments have been described, it should be understood that they have been presented by way of example and not limitation. It will be apparent to persons skilled in the relevant art(s) that various changes in form and detail can be made therein without departing from the spirit and scope of the disclosed subject matter. Thus, the present embodiments should not be limited by any of the above-described embodiments. Accordingly, it is intended that the disclosed subject matter include modifications and variations that are within the scope of the claims appended to (and forming a part of) this disclosure, and their equivalents.

The invention claimed is:

1. A method of virtualization, comprising:
creating a backup image of each of a plurality of computers in a data center, the plurality of computers being connected to a network having a network topology;
collecting configuration information of each of the plurality of computers by a plurality of metadata collection agents, each of the plurality of metadata collection agents being resident on one of the plurality of computers;
saving together with each backup image, supplemental to each backup image, the configuration information of the corresponding computer, the configuration information comprising persistent and volatile state;
creating each backup image as a snapshot of the corresponding computer, the snapshot comprising an application-consistent image as of a specific point in time of primary storage of the corresponding computer;
saving together with the configuration information saved with the backup image, information representing the state of the network connections of the corresponding computer;
loading the backup images as virtual machines in a cloud computing node; and
loading the saved information regarding network connections together with the backup images, and using the saved information regarding network connections to recreate the network connections of each of the plurality of computers.

2. The method of claim 1, further comprising:
collecting by a metadata collection agent the configuration information.

3. The method of claim 2, wherein the metadata collection agent is resident on one of the computers.

4. The method of claim 2, wherein the configuration information comprises network configuration of the data center.

5. The method of claim 4, wherein the network configuration comprises router configuration information, switch configuration information, or network topology information.

6. The method of claim 1, further comprising:
creating a software defined network.

7. The method of claim 6, wherein creating a software defined network comprises:
generating a cloud deployment template.

8. The method of claim 1, further comprising:
probing the network to determine a firewall configuration.

* * * * *